United States Patent
Kumar et al.

(10) Patent No.: US 7,130,073 B2
(45) Date of Patent: Oct. 31, 2006

(54) EFFICIENT STORAGE AND RENDERING OF PATTERNS IN A PRINTER

(75) Inventors: Santhosh Trichur Natrajan Kumar, Kerala (IN); Mohan Kumar Yenigalla, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 854 days.

(21) Appl. No.: 10/141,865

(22) Filed: May 10, 2002

(65) Prior Publication Data

US 2003/0210427 A1 Nov. 13, 2003

(51) Int. Cl.
*G06F 15/00* (2006.01)
(52) U.S. Cl. ..................... 358/1.16; 358/1.13
(58) Field of Classification Search ............... 358/1.16, 358/3.23, 3.15, 1.9, 1.1, 1.2; 400/76, 62, 400/759; 715/734, 838; 382/112; 356/399; 399/366, 82; 359/291, 224, 2
See application file for complete search history.

(56) References Cited

U.S. PATENT DOCUMENTS

| | | | | |
|---|---|---|---|---|
| 5,852,711 A | * | 12/1998 | Campbell | .................. 358/1.18 |
| 5,959,867 A | * | 9/1999 | Speciner et al. | ............. 700/219 |
| 6,020,979 A | * | 2/2000 | Zeck et al. | .................... 358/1.9 |
| 6,330,072 B1 | * | 12/2001 | Barada et al. | ............. 358/1.18 |
| 6,490,055 B1 | * | 12/2002 | Shimizu | ..................... 358/1.9 |
| 7,023,568 B1 | * | 4/2006 | Tsunekawa | ................ 358/1.13 |
| 2002/0054302 A1 | * | 5/2002 | Nakamura | ................... 358/1.2 |

* cited by examiner

*Primary Examiner*—King Y. Poon
*Assistant Examiner*—Saeid Ebrahmi-Dehkordy
(74) *Attorney, Agent, or Firm*—Robert D. Marshall, Jr.; W. James Brady; Frederick J. Telecky, Jr.

(57) ABSTRACT

Patterns are processed minimizing resources such as memory and/or processing power. According to one aspect, when a pattern object is received with the same identifier as that of an earlier received pattern, a count is maintained reflecting a number of times the earlier pattern is to be used in rendering. When the earlier pattern is used as many times as the count in the rendering operations, the earlier pattern is deleted from the memory. According to another aspect, when two patterns are defined based on the same pattern data, the pattern is stored in a common storage area, and a pointer is maintained to the storage area from both the patterns. According to another aspect, even if a pattern is to be used only in the expanded form while rendering, the pattern is stored in non-expanded form until the time of rendering to minimize memory consumption.

30 Claims, 3 Drawing Sheets

EFFICIENT STORAGE AND RENDERING OF PATTERNS IN A PRINTER

BACKGROUND OF THE INVENTION

1. Field of the Invention

The present invention relates to raster image processing in printers, and more specifically to a method and apparatus for efficiently rendering and storing of pattern objects in a page.

2. Related Art

Printers are often used to print a specified content (received from an external system such as personal computers) on medium such as paper. The content to be printed ("page content") is typically specified by page description languages (PDL) such as Postscript (PS) and Printer Control Language (PCL), as is well known in the relevant arts. Printing generally entails converting a page content specified by a PDL to a corresponding bit map. The bit map may then be used to print the content on the desired medium.

Bit maps are often generated by performing logical operations on data representing source, destination and paint. As is well known, a destination generally refers to a bit-map formed by rendering the display-list elements up to that point of time. A source refers to a current display list element being rendered, and paint refers to the shade of color or a pattern that the source may be filled with in the destination.

Patterns are often used in many instances while generating a page. For example, a pattern representing a map may be replicated onto several places of a printed page. In general, the manner in which a pattern is used while generating page content impacts the performance throughput and/or required resources (e.g., memory, processing power, etc). Accordingly, it may be necessary to process a pattern while meeting various requirements.

SUMMARY OF THE INVENTION

According to an aspect ("first aspect") of the present invention, a printer controller contained in a printer receives multiple statements representing a page content to be printed. The statements include a first pattern object representing a first pattern to be used while generating the page content. The printer controller may generate multiple display lists, with each display list specifying a corresponding portion of a page content to be printed using the printer. The printer controller examines the display lists to determine a first number of times the first pattern will be used while rendering.

The first number may be used in a situation in which the first pattern is identified by a first pattern identifier contained in the first pattern object, and the first pattern identifier equals another pattern identifier of another pattern object received by the printer before the first pattern object. The printer controller may store the first pattern object in a memory and count a second number of times the first pattern is used during rendering. The printer controller may remove the first pattern object from the memory after the first number equals the second number. In an embodiment, a counter is set equal to the first number of times and decremented on each use while rendering.

Another aspect of the present invention enables a printer controller to minimize memory requirements when processing two pattern objects which are based on the same pattern data. Typically, the two pattern objects differ in the attributes (e.g., scale factor). The memory requirements may be minimized by storing the pattern data in a memory and implementing pointers to the pattern data associated with the two pattern objects.

One more aspect of the present invention allows for more reduction in memory requirements by storing patterns in a form originally received, even if the PDL statements indicate that the patterns have to be used in expanded form. The patterns are expanded when using the pattern objects in a rendering operation.

Yet another aspect of the present invention stores the expanded patterns in a memory if the amount of memory available exceeds a pre-specified threshold. In an embodiment, the printer controller may expand a pattern in an X-direction by processing the first pattern data to generate an expanded horizontal line. The expanded horizontal line only may be stored in a temporary buffer, and the expanded line expanding the pattern in a Y-direction.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE PREFERRED EMBODIMENTS

1. Overview and Discussion of the Invention

An aspect of the present invention minimizes the amount of memory required to process a pattern object by storing the pattern data (data defining the pattern object) as received, even if the pattern object is to be provided in an expanded form as an input to a logical operation. The pattern object may then be expanded when the expanded pattern object is needed for rendering. According to another aspect, the expanded pattern may also be stored in a memory if the expanded pattern needs to be rendered several times such that the processing power required to generate page content may be minimized.

Another aspect of the present invention allows a pattern object ("old pattern object") identified by a pattern identifier to be rendered accurately even after a new pattern object has been assigned the same pattern identifier. The new pattern object may be stored as another object (instead of replacing the pattern data of the old pattern object) and a counter may be maintained associated with each pattern object. The counter indicates the number of times the pattern object is yet to be used (at any given point of time) for rendering the page content. When the counter reaches zero, the pattern object may be removed from the memory. As a result, the available memory space may be utilized optimally.

Several aspects of the invention are described below with reference to example environments for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Printer

Figure 1:
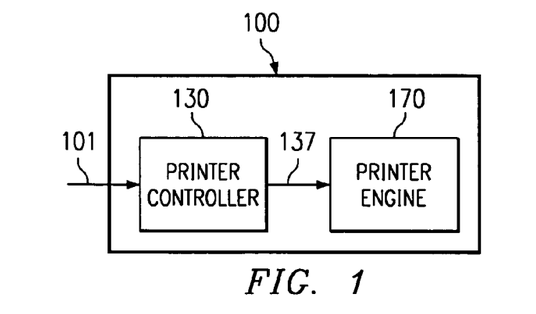
FIG. 1 is a block diagram illustrating the details of an example printer in accordance with the present invention.

FIG. 1 is a block diagram illustrating the details of an embodiment of printer 100 in accordance with the present invention. Printer 100 is shown containing printer controller 130 and printer engine 170. Each component is described in further detail below.

Printer engine 170 receives on path 137 bit maps (representing the page content to be printed) suitable in format for printing, and prints the page content on medium such as paper. Printer engine 170 can be implemented in a known way. In an embodiment, printer engine 170 is implemented using laser technology.

Printer controller 130 may receive statements (defining a page content to be printed) on path 101 from an external computer system (not shown). The statements may be specified in a page description language (PDL) such as Printer Control Language (PCL) or PostScript, well known in the relevant arts.

The PDL statements often define and specify the manner in which pattern objects are to be used in generating page content. The manner in which pattern objects can be used in generating page content is described below with several examples.

3. Processing When Same Identifier Assigned to a New Pattern Object

Figure 2A:
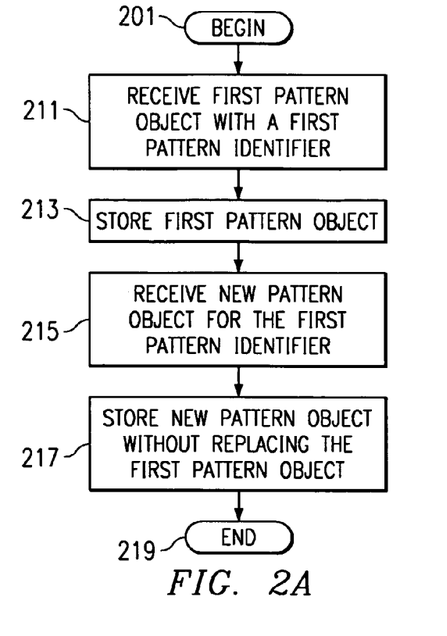
FIG. 2A is a flow chart illustrating the manner in which a new pattern object may be created, according to an aspect of the present invention.
Figure 2B:
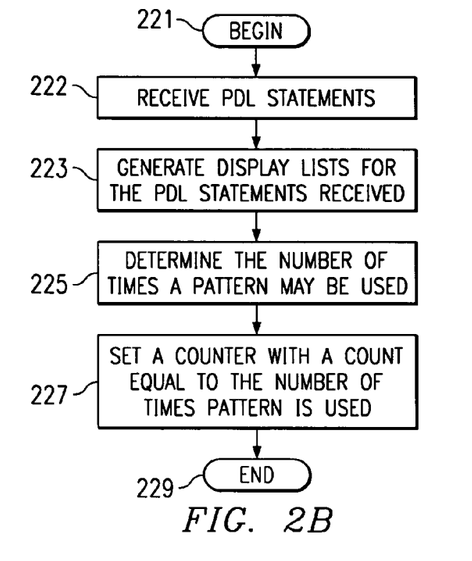
FIG. 2B is a flow chart illustrating the manner in which the number of times a pattern object may be rendered is determined.
Figure 2C:
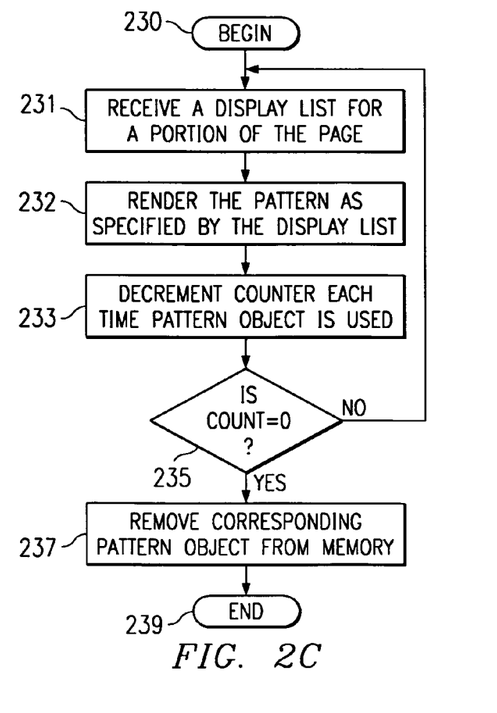
FIG. 2C is a flow chart illustrating the manner in which pattern object may be removed from the memory.

FIGS. 2A–2C are flow charts together illustrating the manner in which printer controller 130 accurately renders a pattern object ("old pattern object") identified by a pattern identifier, even if a new pattern object has been assigned the same pattern identifier (in the PDL statements). The method is described with reference to FIG. 1 for illustration. However, the method can be implemented in other printers as well. The method begins in step 201 of FIG. 2A, in which control immediately passes to step 211.

In step 211, printer controller 130 may receive a first pattern object ("old pattern object") identified by a first pattern identifier. The first pattern object may be specified by the PDL statements received on line 101.

In step 213, the pattern data corresponding to the first pattern object may be stored in a memory. In an embodiment described below, the pattern data of the first pattern object is stored as received even if the pattern is to be provided in an expanded form later for rendering.

In step 215, printer controller 120 may receive additional PDL statements defining a new pattern object, but being identified by the first identifier noted above in step 211. In step 217, the new pattern object may be stored without replacing the first pattern data as the first pattern object may be needed to process the PDL statements received between the first pattern object and the new pattern object.

However, it may be desirable to remove the first pattern object from the memory once all the intended uses of the first pattern object are complete, at least to optimally utilize the available memory space. The manner in which the first pattern object may be used all the times specified by the PDL statements and then removed is described below with reference to FIGS. 2B and 2C.

Broadly, the flowchart of FIG. 2B illustrates a manner by which printer controller 130 determines the number of times of a pattern object needs to be used. The flowchart of FIG. 2C illustrates the manner in which printer controller 130 can make sure that the pattern object is available for rendering, but removed from memory after all the uses.

FIG. 2B is flow chart illustrating the manner in which the number of times the pattern object may need to be rendered is determined according to an aspect of the present invention. The method begins in step 221 and the control immediately passes on to step 222.

In step 222, printer controller 130 receives PDL statements corresponding to the page content to be printed. In step 223, display lists may be generated according to the PDL statements received in step 222. In general, each display list represents a portion of a page. The display lists may be generated in a known way.

In step 225, printer controller 130 may examine the display lists to determine the number of times the pattern may be used while rendering. In an embodiment, the number of times equals the number of display lists using the pattern. Accordingly, even if a pattern is used multiple times within a single display list, it may be counted only once. However, other counting techniques may be implemented without departing from the scope and spirit of the present invention as will be apparent to one skilled in the relevant arts based on the disclosure provided herein.

In step 227, a counter may be implemented with a count set to equal the number of times the pattern may be used as determined in step 225. As described earlier, the pattern object may be removed from the memory once all uses of a pattern object are completed. The manner in which the counter of step 227 may be used to perform such a removal is described below with reference to the flowchart of FIG. 2C. The method begins in step 230 and control immediately passes to step 231.

Continuing with reference to FIG. 2C, in step 231, a display list may be received corresponding to the PDL statements. In step 232, the pattern object may be rendered as specified by the display list. The rendering may be performed in a known way. In step 233, the count may be decremented each time the pattern object is used in rendering. In general, the decrementing approach needs to be consistent with the counting of step 225.

In step 235, a decision is made according to the count of the counter. If count equals zero, control passes over to step 237, and to step 231 otherwise. In step 237, the pattern object may be removed form memory when/if the count equals zero. A count of zero indicates that the pattern object has been rendered as specified by the display lists and is no longer needed for additional rendering.

Thus, a pattern object may be accurately removed from a memory once the use of the object is complete as specified by the PDL statements. The description is continued with respect to example approaches for storing the pattern objects.

4. Storing Pattern Objects

Figure 2D:
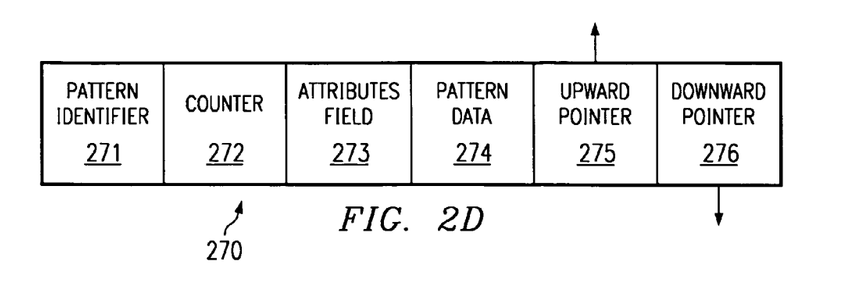
FIG. 2D is a diagram illustrating the details of a data structure representing a pattern object in an embodiment of the present invention.

FIG. 2D is a diagram of data structure 270 illustrating an example approach of storing pattern objects. Data structure 270 is shown containing pattern identifier 271, counter 272, pattern object attributes 273, pattern data 274, upward pointer 275 and downward pointer 276. Each component is described in further detail below.

Pattern identifier 271 identifies an object, and may be specified by the PDL statements as noted above. Counter 272 may represent the number of times the corresponding pattern object is yet to be used. Thus, counter 272 may be set equal to a count, for example, as described above with reference to FIG. 2B. Counter 272 may then be decremented according to uses, for example, as described with reference to FIG. 2C.

A zero value in counter 272 indicates that additional display lists do not require the pattern object for rendering. Accordingly, it may be determined that the scope of the pattern object is over and can be removed from the memory. Attributes field 273 may be used to store attributes such as height, width, scale factor, offset, etc., of the pattern object, and may be specified by the PDL statements. Pattern data 274 may store the bit map of the pattern object.

Upward pointer 275 and downward pointer 276 may be used to implement a two-way linked lists of the data structures representing the pattern objects. Thus, by using upward pointer 275 and downward pointer 276, the adjacent data structures may be accessed. When a pattern object is deleted, the pointers of the two adjacent data structures may also be adjusted to reflect the deletion, and the adjustment may be performed in a known way.

Multiple pattern objects are some times defined based on the same pattern data. Storing the same pattern data in multiple locations may be undesirable, at least in that the available memory space may not be optimally utilized. Accordingly, the manner in which the memory storage may be optimally utilized is described below.

5. Storing Pattern Data in Memory

Figure 3A:
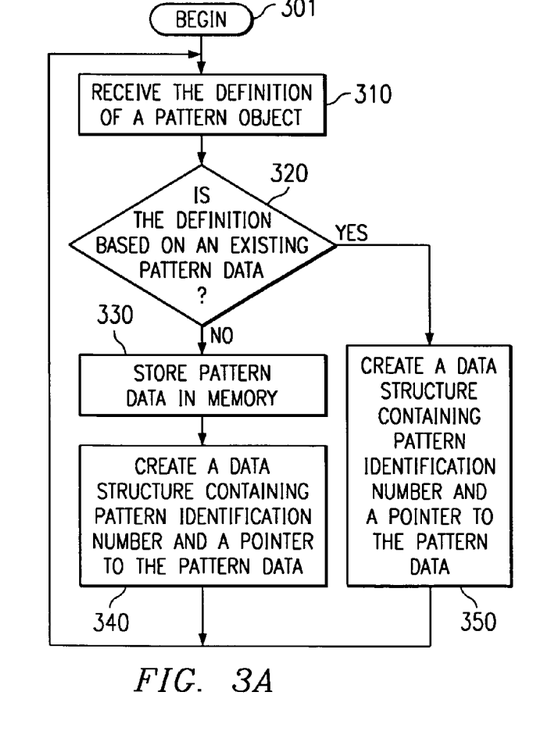
FIG. 3A is a flow chart illustrating a method by which pattern data may be accessed from a memory.

FIG. 3A is a flow chart illustrating the manner in pattern objects based on the same pattern data may be efficiently stored according to an aspect of the present invention. The flow chart is described with reference to FIG. 3B containing several data structures 370, 380 and 390, and pattern data storage areas 375 and 385. The method begins in step 301 and control immediately passes to step 310.

In step 310, the definition of a pattern object may be received in the form of PDL statements. The pattern object generally contains the pattern data and a pattern identifier. In step 320, a determination is made as to whether the definition is based on a pattern data of a pattern object received previously. If the definition is based on the pattern data of the pattern object, control passes to step 330, and to step 350 otherwise.

Figure 3B:
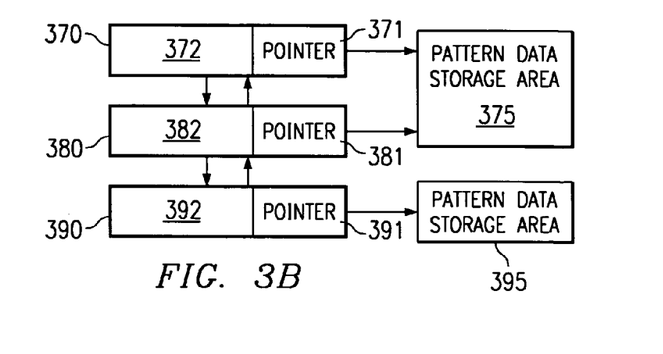
FIG. 3B is a block diagram illustrating the manner in which data structures may access pattern data stored in a memory.

In step 330, the pattern data received in step 310 may be stored in the memory. In step 340, a data structure may be created containing the pattern identifier and a pointer pointing to a location where the pattern data is stored. Thus, a first received pattern object may be stored using data structure 370 and the corresponding pattern data may be stored in pattern data storage area 375.

Another pattern object may be received and stored using data structure 390 and pattern data storage area 395. Pointers 371 and 391 may point to pattern data storage areas 375 and 395 respectively. Each of fields 372 and 382 (and 392) may contain all the fields of FIG. 2D, except counter 272 and pattern data 274. Counter 272 may be associated with the pattern data itself (as opposed to each pattern object).

The description is continued assuming that a third pattern object having a definition based on the pattern data of the first pattern object, is received. Control then passes to step 350 as described above.

In step 350, a data structure may be created for the received object, and the data structure may point to the pattern data of the another pattern object using which the received object is defined. With respect to FIG. 3B, the third pattern object may be stored using data structure 380. Pointer 381 in data structure 380 may point to pattern data storage area 375 storing the pattern data of the first pattern.

Thus, using an approach according to FIGS. 3A and 3B, any available memory may be optimally stored when multiple pattern objects are stored based on the same pattern data. The description is continued with reference to example approaches using which the processing and/or memory requirements may be minimized when processing pattern data.

6. Reducing Process/Memory Requirements

Figure 4:
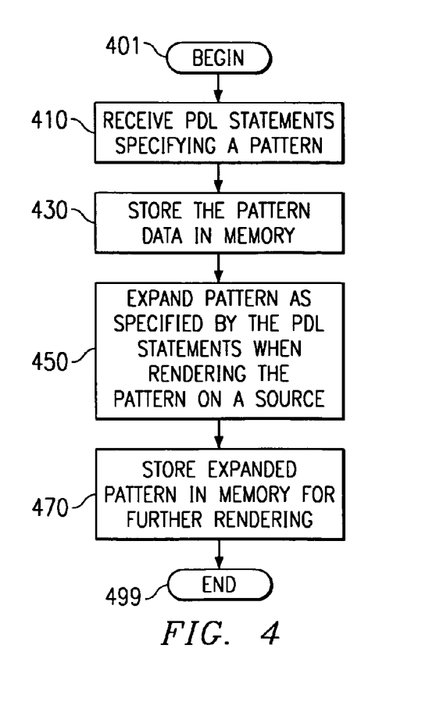
FIG. 4 is a flow chart illustrating the manner in which the pattern data may be stored using minimal memory, according to an aspect of the present invention.

FIG. 4 is a flow chart illustrating the manner in which the processing and/or memory requirements may be reduced in printer controller 130 in an embodiment of the present invention. The method begins in step 401 and the control immediately passes to step 410.

In step 410, PDL statements may be received which specify a pattern object. In general, a pattern object contains a pattern identifier and pattern data. In step 430, the pattern data corresponding to the pattern object (specified in step 410) may be stored without expansion in a memory, even if the pattern data is required to be expanded while rendering. By not expanding the pattern data, memory requirements may be minimized.

In step 450, the pattern data is expanded during a rendering operation such that bits representing the expanded image are consumed by (used for) logical operations quickly after being generated. By storing the pattern data without expansion and expanding the pattern object during rendering operation, the memory requirements in printer controller 130 may be reduced.

In step 470, the expanded pattern data may be stored in memory. For example, a certain portion of the total memory may be allocated for storing expanded pattern data, and if sufficient memory space (in the allocated space) is available, the expanded pattern data may be stored. Thus, if the stored pattern is needed to be used in an expanded form again, the expanded form may be available without requiring much additional processing.

The above method may thus decrease the processing time as the pattern data is expanded only once and potentially used several times. Thus, by using the above approach the memory and/or processing requirements may be reduced in implementing printer controller 130. The description is continued with reference to example embodiments of printer controller 130 which implement several of the features described above.

7. Printer Controller

Figure 5:
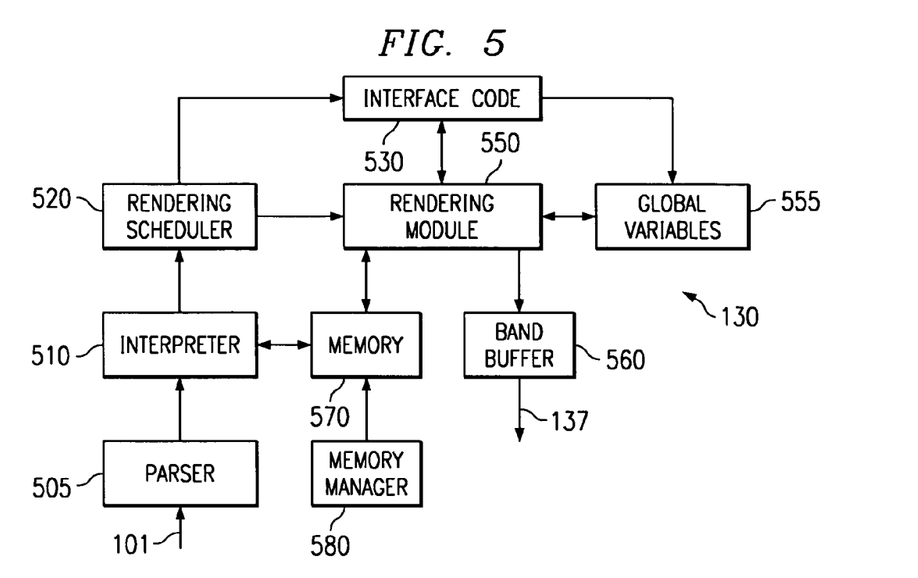
FIG. 5 is a block diagram illustrating the details of an embodiment of a printer controller.

FIG. 5 is a block diagram illustrating the details of an embodiment of printer controller 130 implemented in accordance with the present invention. Printer controller 130 is shown containing parser 505, interpreter 510, rendering scheduler 520, interface code 530, rendering module 550, global variables block 555, band buffer 560, memory 570 and memory manager 580. Each component is described in further detail below.

Parser 505 ensures that the statements (describing a page content) received on path 101 are consistent with a page description language (PDL), and passes the received statements to interpreter 510. Parser 505 may be implemented in a known way.

Interpreter 510 converts the PDL statements to display lists, which are used to generate bit maps later. Interpreter 510 may store the bit maps representing patterns without expansion even if the patterns are to be used in expanded form during rendering. Interpreter 510 stores the pattern objects in memory 570, for example, as described with reference to FIGS. 3A and 3B.

In addition, at least when a pattern object is received with the same identifier as another prior pattern object, interpreter 510 may maintain a counter as described above with reference to FIGS. 2A, 2B and 2D.

Interface code 530 provides the interface between rendering scheduler 520 and rendering module 550. In general, interface code 530 interfaces with rendering scheduler 520, and performs various initializations required for rendering module 550. Global variables 555 represents various values used for rendering (and other operations) which generates bit maps representing the page.

Rendering module 550 generates a bit map representing the page content as specified by the display list. In general, the bit map is generated by performing logical operations such as OR, XOR, and NOT are performed on a combination of source, destination and paint, as is well known in the relevant arts. Rendering module 550 may decrement counter 272 (of FIG. 2D) upon each use of a corresponding pattern object while rendering. Bit maps representing source and paint may be received from memory 570. The bit maps representing page content may be stored in band buffer 560 for sending to printer engine 170.

With respect to using pattern objects while rendering, rendering module 550 may receive bit map representing a pattern object from memory 570. Rendering module 550 may expand the pattern and perform logical operations using the expanded pattern. In general, the extent of expansion (in X-direction and Y-direction) is specified by PDL statements and stored in attributes field 273. The pattern data may be processed to generate a bit map representing the expanded pattern.

As noted above, with reference to step 470, the bit map representing the expanded pattern may be stored in memory 570. As a result, the amount of processing required to generate page content may be reduced.

On the other hand, even when a pattern is not required to be used multiple times, a temporary buffer (implemented in memory 570) may be used to store intermediate data used many times for the expansion operation. In an embodiment, the original pattern data is expanded in the X-direction (i.e., rasterization direction), and the resulting data is stored in the temporary buffer. The data in the temporary buffer may be used multiple times to expand the pattern in the Y-direction. The expanded image thus generated may be used as an input to logical operations to render a destination image.

Memory manager 580 may examine counter 272 of each pattern object and remove the pattern object if the count value equals zero. Removal generally entails adjusting pointers 275 and 276 in the two adjacent data structures to account for the removal. In addition, the memory space storing the pattern data needs to be freed such that the memory space is available for other purposes.

According to another aspect of the present invention, memory manager 580 may minimize fragmentation of available space in a memory space shared for several purposes. As is well known, fragmentation generally refers to a situation in which several small portions of memory space are available in dis-contiguous positions such that a large block of contiguous memory locations are not available. It may be desirable to allocate contiguous memory locations to different entities as is well known in the relevant arts. Excessive fragmentation may not permit such allocation of contiguous memory locations.

To avoid excessive fragmentation, memory manager 580 may allocate memory space for entities ("short term entities") which are likely to be used only for a short time in one area of the memory, and for entities ("long term entities") which are likely to be used for a long time in another area of the memory. For example, memory may be allocated in one direction (lower addresses to higher addresses) for long term entities and in another direction for the short term patterns. Examples of long term entities include patterns used for an entire session. Examples of short term entities include the rendered image which is sent to the printer for printing and patterns used only temporarily.

Due to such allocation, the memory space allocated for the short term entities may be released quickly for later use. Large block of contiguous locations may thus be available if needed. In an embodiment described below (software implementation), memory manager 580 is implemented as a low priority operating system task, which is executed during otherwise 'idle time' of a processing unit.

Thus, using the approaches described above, several embodiments of printer 100 may be implemented while minimizing processing and/or memory requirements. The embodiments may be implemented in a combination of software, hardware and firmware. The description is continued with reference to an embodiment of printer controller 130 implemented substantially in software.

8. Software Implementation

Figure 6:
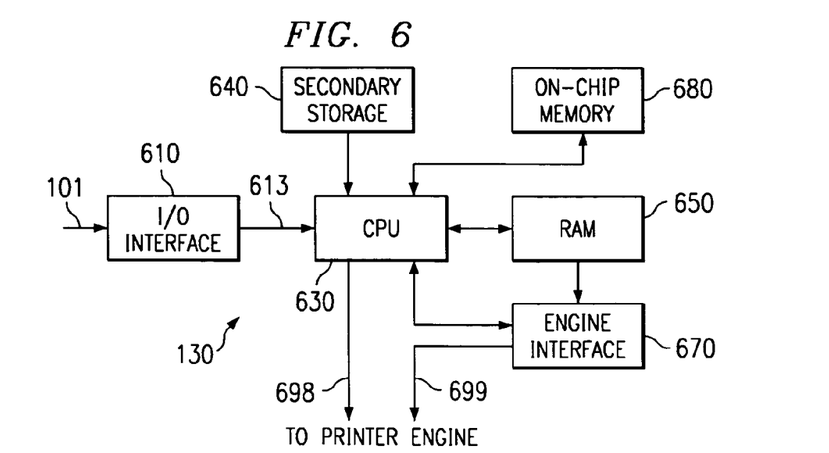
FIG. 6 is a block diagram illustrating the details of an embodiment of a printer controller implemented substantially in software.

FIG. 6 is a block diagram illustrating the details of printer controller 130 implemented in software according to an aspect of the present invention. Printer controller 130 is shown containing input/output (I/O) interface 610, central processing unit (CPU) 630, secondary memory 640, random access memory (RAM) 650, engine interface 670, and on-chip memory 680. Each component is described below in further detail.

Input/output interface 610 provides the physical, electrical and protocol interface with an external system such as personal computer (not shown). I/O interface 610 receives statements on path 101 specifying a page content according to a page description language (PDL) such as Printer Control Language (PCL) or PostScript. I/O interface 610 forwards the statements to CPU 630 on line 613. I/O interface 610 may be implemented in a known way.

Engine interface 670 provides the physical, electrical and protocol interface between printer controller 130 and printer engine 170. Engine interface 670 retrieves the bit maps from RAM 650, and sends the retrieved bits on path 699. Path 698 may provide the control signals corresponding to the data transfers and other aspects of interface between printer controller 130 and printer engine 170. Lines 698 and 699 together represent line 137 illustrated in FIG. 1. Engine interface 670 may be implemented in a known way.

Secondary memory 640 may contain units such as hard drive (not shown), removable storage (e.g., flash memory, also not shown). Secondary storage 640 may store software instructions and data (for example, the global parameters), which enable CPU 630 to provide several features in accordance with the present invention. The software instructions may be provided to CPU 630 from other sources such as over a network implemented using protocols such as TCP/IP.

CPU 630 executes the instructions provided from secondary memory to process the print statements and generate bit maps representing a page content. Pattern objects may be used for rendering as described in the sections above. The resulting bit maps may be eventually stored in RAM 650. The instructions may also cause the bit map to be provided to printer engine 170 on path 698.

RAM 650 may be used to store the instructions prior to execution. In addition, RAM 650 may be used to implement band buffer 560 and memory 570. On chip memory 640 stores the rendered bit maps, which are eventually transferred to band buffer implemented in RAM 650.

An embodiment of the present invention is implemented using software running (that is, executing) in printer controller 130. In this document, the term "computer program product" is used to generally refer to removable storage unit or hard disk installed in hard drive. These computer program products are means for providing software to printer 100.

9. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of processing a first pattern object representing a first pattern, said method being performed in a printer, said method comprising:
   receiving a plurality of statements representing a page content to be printed in a page description language (PDL), said plurality of statements including said first pattern object;
   generating a plurality of display lists, wherein each of said plurality of display lists specifies a corresponding portion of a page content to be printed using said printer; and
   examining said plurality of display lists to determine a first number of times said first pattern will be used while rendering.

2. The method of claim 1, wherein said first pattern is identified by a first pattern identifier contained in said first pattern object, wherein said first pattern identifier equals another pattern identifier of another pattern object received by said printer before said first pattern object, said first pattern object being stored in a memory, said method further comprising:
   counting a second number of times said first pattern is used during rendering; and
   removing said first pattern object from said memory after said first number equals said second number.

3. The method of claim 2, wherein said counting comprises:
   setting a counter to equal said first number; and
   decrementing said counter each time said first pattern is used for rendering.

4. The method of claim 2, further comprising storing said first pattern object and said another pattern object in a memory.

5. The method of claim 2, further comprising:
   receiving a definition of a second pattern object representing a second pattern, wherein said definition is based on a first pattern data contained in said first pattern object;
   storing said first pattern data in said memory; and
   maintaining a first pointer and a second pointer associated with said first pattern object and said second pattern object respectively, wherein both of said first pointer and said second pointer point to said first pattern data store in said memory.

6. The method of claim 2, wherein said first pattern object is defined to be used in an expanded form, said method further comprising:
   storing a first pattern data contained in said first pattern object without expanding; and
   expanding said first pattern object by processing said first pattern data, wherein said expanding is performed when using said pattern object in a rendering operation.

7. The method of claim 6, further comprising storing in said memory an expanded pattern data, wherein said expanded pattern data is generated by said expanding.

8. The method of claim 6, further comprising:
   expanding said pattern in an X-direction by processing said first pattern data, wherein said expanding in an X-direction generates an expanded horizontal line;
   storing said expanded horizontal line in a temporary buffer, and
   using said expanded line for expanding said pattern in a Y-direction.

9. A method of processing a plurality of statements indicating that a pattern is to be used in an expanded form in a rendering operation, said plurality of statements specifying said pattern in the form of a pattern object according to a page description language (PDL), said pattern object containing a pattern data and a plurality of attributes, said method being performed in a printer, said method comprising:
   storing said pattern data in a memory as a pattern object as received in said page description language (PDL) without expanding said pattern;
   determining a first number of times said pattern object will be used while rendering;
   upon a first occurrence of rendering using said pattern object expanding said pattern object by processing said pattern data, wherein said expanding is performed when using said pattern object in a rendering operation, determining from said first number whether said pattern object is to be used in further rendering operations, determining if there is sufficient memory to store said expanded pattern object, then storing said expanded pattern object in memory only if said pattern object is to be used in further rendering operations and there is sufficient memory; and
   upon subsequent occurrences of rendering using said pattern object determining if said expanded pattern object is stored in memory, then rendering said pattern object from said expanded pattern object stored in memory if said expanded pattern object is stored in memory, else expanding said pattern object by processing said pattern data and performing a rendering operation upon said newly expanded pattern object if said expanded pattern object is not stored in memory.

10. The method of claim 9, further comprising:
expanding said pattern in an X-direction by processing said pattern data, wherein said expanding in an X-direction generates an expanded horizontal line;
storing said expanded horizontal line in a temporary buffer, and
using said expanded line for expanding said pattern in a Y-direction.

11. A computer readable medium carrying one or more sequences of instructions for causing a printer to process a first pattern object representing a first pattern, wherein execution of said one or more sequences of instructions by one or more processors contained in said printer causes said one or more processors to perform the actions of:
receiving a plurality of statements representing a page content to be printed in a page description language (PDL), said plurality of statements including said first pattern object;
generating a plurality of display lists, wherein each of said plurality of display lists specifies a corresponding portion of a page content to be printed using said printer; and
examining said plurality of display lists to determine a first number of times said first pattern will be used while rendering.

12. The computer readable medium of claim 11, wherein said first pattern is identified by a first pattern identifier contained in said first pattern object, wherein said first pattern identifier equals another pattern identifier of another pattern object received by said printer before said first pattern object, said first pattern object being stored in a memory, further comprising:
counting a second number of times said first pattern is used during rendering; and
removing said first pattern object from said memory after said first number equals said second number.

13. The computer readable medium of claim 12, wherein said counting comprises:
setting a counter to equal said first number; and
decrementing said counter each time said first pattern is used for rendering.

14. The computer readable medium of claim 12, further comprising storing said first pattern object and said another pattern object in a memory.

15. The computer readable medium of claim 12, further comprising:
receiving a definition of a second pattern object representing a second pattern, wherein said definition is based on a first pattern data contained in said first pattern object;
storing said first pattern data in said memory; and
maintaining a first pointer and a second pointer associated with said first pattern object and said second pattern object respectively, wherein both of said first pointer and said second pointer point to said first pattern data store in said memory.

16. The computer readable medium of claim 12, wherein said first pattern object is defined to be used in an expanded form, further comprising:
storing a first pattern data contained in said first pattern object without expanding; and
expanding said first pattern object by processing said first pattern data, wherein said expanding is performed when using said pattern object in a rendering operation.

17. The computer readable medium of claim 16, further comprising storing in said memory an expanded pattern data, wherein said expanded pattern data is generated by said expanding.

18. The computer readable medium of claim 16, further comprising:
expanding said pattern in an X-direction by processing said first pattern data, wherein said expanding in an X-direction generates an expanded horizontal line;
storing said expanded horizontal line in a temporary buffer, and
using said expanded line for expanding said pattern in a Y-direction.

19. A computer readable medium carrying one or more sequences of instructions for causing a printer to process a plurality of statements indicating that a pattern is to be used in an expanded form in a rendering operation, said plurality of statements specifying said pattern in the form of a pattern object according to a page description language (PDL), said pattern object containing a pattern data and a plurality of attributes, wherein execution of said one or more sequences of instructions by one or more processors contained in said printer causes said one or more processors to perform the actions of:
storing said pattern data in a memory as a pattern object as received in said page description language (PDL) without expanding said pattern;
determining a first number of times said pattern object will be used while rendering;
upon a first occurrence of rendering using said pattern object expanding said pattern object by processing said pattern data, wherein said expanding is performed when using said pattern object in a rendering operation, determining from said first number whether said pattern object is to be used in further rendering operations, determining if there is sufficient memory to store said expanded pattern object, then storing said expanded pattern object in memory only if said pattern object is to be used in further rendering operations and there is sufficient memory; and
upon subsequent occurrences of rendering using said pattern object determining if said expanded pattern object is stored in memory, then rendering said pattern object from said expanded pattern object stored in memory if said expanded pattern object is stored in memory, else expanding said pattern object by processing said pattern data and performing a rendering operation upon said newly expanded pattern object if said expanded pattern object is not stored in memory.

20. The computer readable medium of claim 19, further comprising:
expanding said pattern in an X-direction by processing said pattern data, wherein said expanding in an X-direction generates an expanded horizontal line;
storing said expanded horizontal line in a temporary buffer, and
using said expanded line for expanding said pattern in a Y-direction.

21. A printer for processing a first pattern object representing a first pattern, said printer comprising:
means for receiving a plurality of statements representing a page content to be printed in a page description language (PDL), said plurality of statements including said first pattern object;

means for generating a plurality of display lists, wherein each of said plurality of display lists specifies a corresponding portion of a page content to be printed using said printer; and means for examining said plurality of display lists to determine a first number of times said first pattern will be used while rendering.

22. The printer of claim 21, wherein said first pattern is identified by a first pattern identifier contained in said first pattern object, wherein said first pattern identifier equals another pattern identifier of another pattern object received by said printer before said first pattern object, said first pattern object being stored in a memory, said printer further comprising:

means for counting a second number of times said first pattern is used during rendering; and means for removing said first pattern object from said memory after said first number equals said second number.

23. The printer of claim 22, wherein said counting comprises:

means for setting a counter to equal said first number; and means for decrementing said counter each time said first pattern is used for rendering.

24. The printer of claim 22, further comprising means for storing said first pattern object and said another pattern object in a memory.

25. The printer of claim 22, further comprising:

means for receiving a definition of a second pattern object representing a second pattern, wherein said definition is based on a first pattern data contained in said first pattern object;

means for storing said first pattern data in said memory; and means for maintaining a first pointer and a second pointer associated with said first pattern object and said second pattern object respectively, wherein both of said first pointer and said second pointer point to said first pattern data store in said memory.

26. The printer of claim 22, wherein said first pattern object is defined to be used in an expanded form, said printer further comprising:

means for storing a first pattern data contained in said first pattern object without expanding; and means for expanding said first pattern object by processing said first pattern data, wherein said means for expanding performs expanding when using said pattern object in a rendering operation.

27. The printer of claim 26, further comprising means for storing in said memory an expanded pattern data, wherein said expanded pattern data is generated by said means for expanding.

28. The printer of claim 26, further comprising:

means for expanding said pattern in an X-direction by processing said first pattern data, wherein said means for expanding in an X-direction generates an expanded horizontal line;

means for storing said expanded horizontal line in a temporary buffer, and means for using said expanded line for expanding said pattern in a Y-direction.

29. A printer of processing a plurality of statements indicating that a pattern is to be used in an expanded form in a rendering operation, said plurality of statements specifying said pattern in the form of a pattern object according to a page description language (PDL), said pattern object containing a pattern data and a plurality of attributes, said printer comprising:

means for storing said pattern data in a memory as a pattern object as received in said page description language (PDL) without expanding said pattern;

means for determining a first number of times said pattern object will be used while rendering;

means for upon a first occurrence of rendering using said pattern object expanding said pattern object by processing said pattern data, wherein said expanding is performed when using said pattern object in a rendering operation, determining from said first number whether said pattern object is to be used in further rendering operations, determining if there is sufficient memory to store said expanded pattern object, then storing said expanded pattern object in memory only if said pattern object is to be used in further rendering operations and there is sufficient memory; and means for upon subsequent occurrences of rendering using said pattern object determining if said expanded pattern object is stored in memory, then rendering said pattern object from said expanded pattern object stored in memory if said expanded pattern object is stored in memory, else expanding said pattern object by processing said pattern data and performing a rendering operation upon said newly expanded pattern object if said expanded pattern object is not stored in memory.

30. The printer of claim 29, further comprising:

means for expanding said pattern in an X-direction by processing said pattern data, wherein said expanding in an X-direction generates an expanded horizontal line;

means for storing said expanded horizontal line in a temporary buffer, and means for using said expanded line for expanding said pattern in a Y-direction.

* * * * *